United States Patent Office 2,816,014
Patented Dec. 10, 1957

2,816,014
METHOD OF PROMOTING SEED GERMINATION

Ernst Ambuhl, Barcelona, Spain

No Drawing. Application March 29, 1954,
Serial No. 419,620

Claims priority, application Switzerland July 17, 1948

8 Claims. (Cl. 71—1)

The present invention relates to a method of promoting seed germination and to seeds treated according to the present invention and thereby having an improved germination ability.

The present application is a continuation-in-part of my copending application Serial No. 80,556 filed March 9, 1949 now abandoned, for "Method of Promoting the Growth of Cultured Plants and Their Seeds, Strikings and Sets."

It is the general practice in the promotion of the growth of cultured plants and their seeds, strikings and sets to fertilize the plant after inserting the same in the ground, utilizing known fertilizers such as dung water, dung, mineral substances and the like. Although the fertilization of plants is extremely helpful in the promotion of the growth of the plants, it has two major disadvantages. The fertilizer material utilized does not come into contact until roots are formed. In other words it is the roots which extract the food, including the fertilizer, from the soil for the building up of the plant. However, the seed kernel must depend solely upon its own reserve of food substances such as carbohydrates, proteins, mineral salts, etc. until the roots are formed. If this reserve is insufficient, then, either the seeds do not develop at all, or the seeds develop only into very weak plants. Simple examples are beans, peas, and potatoes, wherein it often happens that although the seeds used apparently has a good germination ability, bad weather, soil being too wet, etc., often results in that only a portion of the seeds develop properly and it is even necessary to replant these seeds. This is due to a defficiency of germination energy which is not overcome by fertilizing the soil because the seed can make no use of the fertilizer in the soil until after the development of roots.

Another disadvantage of the known methods of fertilization is the big expense involved since it is necessary to utilize a large amount of active fertilizer material to sufficiently fertilize the soil containing the seeds to make certain that all of the seeds, after the development of roots, can come in contact with and thereby utilize the active fertilizer.

It has been suggested to pre-moisten the seeds before planting thereof and to treat these seeds with corrosives such as copper sulphate, formalin and the like. It has also been suggested to impregnate the seeds with inorganic substances such as phosphorous, calcium, potassium, magnesium, nitrates, iron and traces of other elements by soaking the seeds in solutions thereof. However, these methods do not effectively increase the germination ability of the seeds, apparently because the substances are either not in such harmonic relationship that the seeds can make proper use thereof or because certain necessary substances are missing.

It is therefore a primary object of the present invention to provide a method of treating seeds whereby the germination ability of the seeds are improved and the seeds are able to germinate and plants grow even under adverse conditions.

It is another object of the present invention to provide a method of treating seeds whereby the germination ability of the seed is increased to such extent that larger crops are produced in a unit area utilizing a unit amount of seeds than was possible with untreated seeds or with seeds treated in other manners.

It is still another object of the present invention to provide as a new composition of matter seeds treated according to the present invention and being impregnated with and containing therein substances which greatly improve the germination ability of the seeds.

It is a further object of the present invention to provide for the use of certain specific plants in a certain manner to treat seeds in order to improve the germination ability of the seeds.

Other objects and advantages of the present invention will be apparent from a further reading of the specification and of the appended claims.

With the above objects in view, the present invention mainly comprises a method of promoting the germination of plant seeds, comprising the steps of soaking plant seeds before planting with an aqueous solution containing in solution the water soluble substances of at least one plant of the family Aizoaceae until the seeds have absorbed the substances, thereby increasing the germination ability of the seeds, and recovering impregnated seeds having an increased germination ability.

It has been found according to the present invention that although some plants may improve the germination ability of seeds treated therewith according to the process of the present invention, by far the best results are obtained utilizing plants of the family Aizoaceae and particularly utilizing the mesembryanthemum plant. These plants contain in large amount soluble iron salts in the form of chlorides. These substances act against chlorosis and catalytically aid in the formation of chlorophyl in the plant whereby photosynthesis is improved and better growth is obtained.

It has been found that the same results are not obtainable by adding the simple iron salts in the form of chlorides to the seeds. Apparently this is due to the fact that the plants of the Aizoaceae family and particularly the mesembryanthemum contain the iron salts along with other mineral salts and other substances in a biologically harmonic form which greatly improves the germination of the seed when incorporated into the seed according to the process of the present invention before the start of the germination.

The impregnation of the seeds according to the present invention with plants of the Aizoaceae family and particularly with mesembryanthemum activates the germination energy of the seeds and greatly increases the same. This pre-treatment also has the affect of regenerating seeds which under normal circumstances cannot be utilized for sowing because of a deficiency of germination ability so that these seeds have improved germination ability and may now be used.

Seeds are impregnated according to the present invention with plants of the Aizoaceae family and particuarly with the mesembryanthemum by finally comminuting the plant and preferably pulverizing the same and mixing the pulverized plant with water until an aqueous solution of the mixture of active substances contained in the plant is formed. The seeds are then soaked in this aqueous solution until the seeds are saturated with the solution thereby resulting in absorption inside the seeds of the germination promoting active substances from the plant.

It is to be understood that the present invention applies to seeds of any plants such as beans, peas, etc.

It has been found somewhat advantageous to add additional plant materials, in pulverized form, to the pulverized plants of the Aizoaceae such as mesembryanthemum, for example arnica, capsula bursis pastoris and dried olive leaves, before forming the aqueous solution of the active substances and impregnating the seeds with the thus formed aqueous solution.

The following examples are given as illustrative of the process of the present invention, the scope of the invention not however being limited to the details of the examples.

EXAMPLE 1

1 kg. of finely pulverized mesembryanthemum is thoroughly mixed with about 50 liters of water until a solution is formed. 25 kg. of seeds to be treated are placed in the solution and allowed to stand therein for about three hours. The thus treated seeds are now impregnated with the germination promoting substances from the mesembryanthemum and may then be planted in soil in the usual manner. Seeds treated in this manner give much higher production than do untreated seeds.

EXAMPLE 2

1 kg. of finely pulverized mesembryanthemum is mixed with 1 kg. of finely pulverized dried olive leaves. The thus formed mixture is then mixed with about 50 liters of water until a solution is formed. The thus formed solution is used for treating about 25 kg. of seeds by alowing the seeds to remain in the soluution for about three hours or until the seeds have absorbed the active ingredients. The thus treated seeds may then be planted in normal manner.

The following tests were carried out to determine the improvement in the germination ability of seeds of different wheats treated according to the present invention. In the following table the term "Product" refers to the aqueous solution of mesembryanthemum of the present invention. The same amount of seeds were treated in each test.

Table A.—Seeds unwatered

| Type of wheat | With Product, kgs. | Without Product, kgs. | Difference | Percent Difference |
|---|---|---|---|---|
| "Libero" | 2.940 | 2.330 | 0.610 | 26 |
| "Salto" | 2.411 | 2.157 | 0.254 | 12 |
| "Montjuich" | 2.335 | 2.035 | 0.300 | 15 |
| "Aragon 03" | 2.229 | 1.991 | 0.238 | 12 |
| "Mentana" | 2.103 | 1.853 | 0.250 | 13.5 |
| "Tevere" | 2.181 | 1.546 | 0.635 | 40 |
| "Rome" | 1.853 | 1.677 | 0.177 | 10.6 |
| "Ricti" | 1.738 | 1.433 | 0.305 | 21 |
| "Velino" | 1.508 | 1.303 | 0.205 | 16 |
| "Turano" | 1.346 | 1.085 | 0.261 | 24 |
| "Virgilio" | 1.218 | 1.187 | 0.031 | 2.6 |

Table B.—Seeds watered

| Type of wheat | With Product, kgs. | Without Product, kgs. | Difference | Percent Difference |
|---|---|---|---|---|
| "Mentana" | 4.413 | 3.695 | 0.718 | 19.5 |
| "Salto" | 3.808 | 3.164 | 0.644 | 20.5 |
| "Libero" | 3.542 | 3.128 | 0.414 | 13 |
| "Aragon 03" | 3.580 | 2.709 | 0.871 | 32 |
| "Tevere" | 3.390 | 2.715 | 0.674 | 25 |
| "Rieti" | 3.014 | 2.646 | 0.368 | 14 |
| "Montjuich" | 3.225 | 2.409 | 0.816 | 34 |
| "Roma" | 3.068 | 2.219 | 0.849 | 38 |
| "Velino" | 3.311 | 1.901 | 1.410 | 70 |
| "Virgilio" | 2.374 | 1.770 | 0.604 | 34 |
| "Turano" | 1.805 | 1.785 | 0.020 | 1.2 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of promoting the germination of plant seeds, comprising the steps of soaking plant seeds before planting with an aqueous solution containing in solution the water soluble substances of at least one plant of the family Aizoaceae until said seeds have absorbed said substances, thereby increasing the germination ability of said seeds; and recovering impregnated seeds having an increased germination ability.

2. A method of promoting the germination of plant seeds, comprising the steps of soaking plant seeds before planting with an aqueous solution containing in solution the water soluble substances of mesembryanthemum plants until said seeds have absorbed said substances, thereby increasing the germination ability of said seeds; and recovering impregnated seeds having an increased germination ability.

3. A method of promoting the germination of plant seeds, comprising the steps of pulverizing at least one plant of the Aizoaceae family; dissolving the thus pulverized plant in water so as to form an aqueous solution thereof; soaking plant seeds before planting with said aqueous solution containing in solution the water soluble substances of at least one plant of the family Aizoaceae until said seeds have absorbed said substances, thereby increasing the germination ability of said seeds; and recovering impregnated seeds having an increased germination ability.

4. A method of promoting the germination of plant seeds, comprising the steps of soaking plant seeds before planting with an aqueous solution containing in solution the water soluble substances of at least one plant of the famiy Aizoaceae and at least one plant selected from the class consisting of arnica, capsula bursis pastoris and finely cumminuted dried olive leaves until said seeds have absorbed said substances, thereby increasing the germination ability of said seeds; and recovering impregnated seeds having an increased germination ability.

5. A method of promoting the germination of plant seeds, comprising the steps of soaking plant seeds before planting with an aqueous solution containing in solution the water soluble substances of at least one plant of the family Aizoaceae and of finely comminuted dried olive leaves until said seeds have absorbed said substances, thereby increasing the germination ability of said seeds; and recovering impregnated seeds having an increased germination ability.

6. An article of manufacture, comprising a plant seed impregnated with and containing therein the water soluble substances of at least one plant of the family Aizoaceae which increases the germination ability of said seed.

7. An article of manufacture, comprising a plant seed impregnated with and containing therein the water soluble substances of mesembryanthemum plants which increases the germination ability of said seed.

8. An article of manufacture, comprising a plant seed impregnated with and containing therein the water soluble substances of at least one plant of the family Aizoaceae and at least one plant selected from the class consisting of arnica, capsula bursis pastoris and finely comminuted dried olive leaves which increase the germinaiton ability of said seed.

References Cited in the file of this patent

UNITED STATES PATENTS

| 1,762,294 | Gericke | June 10, 1930 |
| 2,051,460 | Skrbensky | Aug. 18, 1936 |
| 2,313,057 | Fischer | Mar. 9, 1943 |
| 2,320,060 | Barlow | May 25, 1943 |
| 2,664,350 | Hale et al. | Dec. 29, 1953 |

OTHER REFERENCES

Agricultural Journal of India, vol. 25, No. 5, published 1930, page 368.

Palestine Journal of Botany, J. Series, vol. 4, No. 2, published November 1947, pages 77–85.